Nov. 20, 1923.
C. B. MAYER
ELECTRICAL VALVE
Filed June 4, 1920
1,475,129
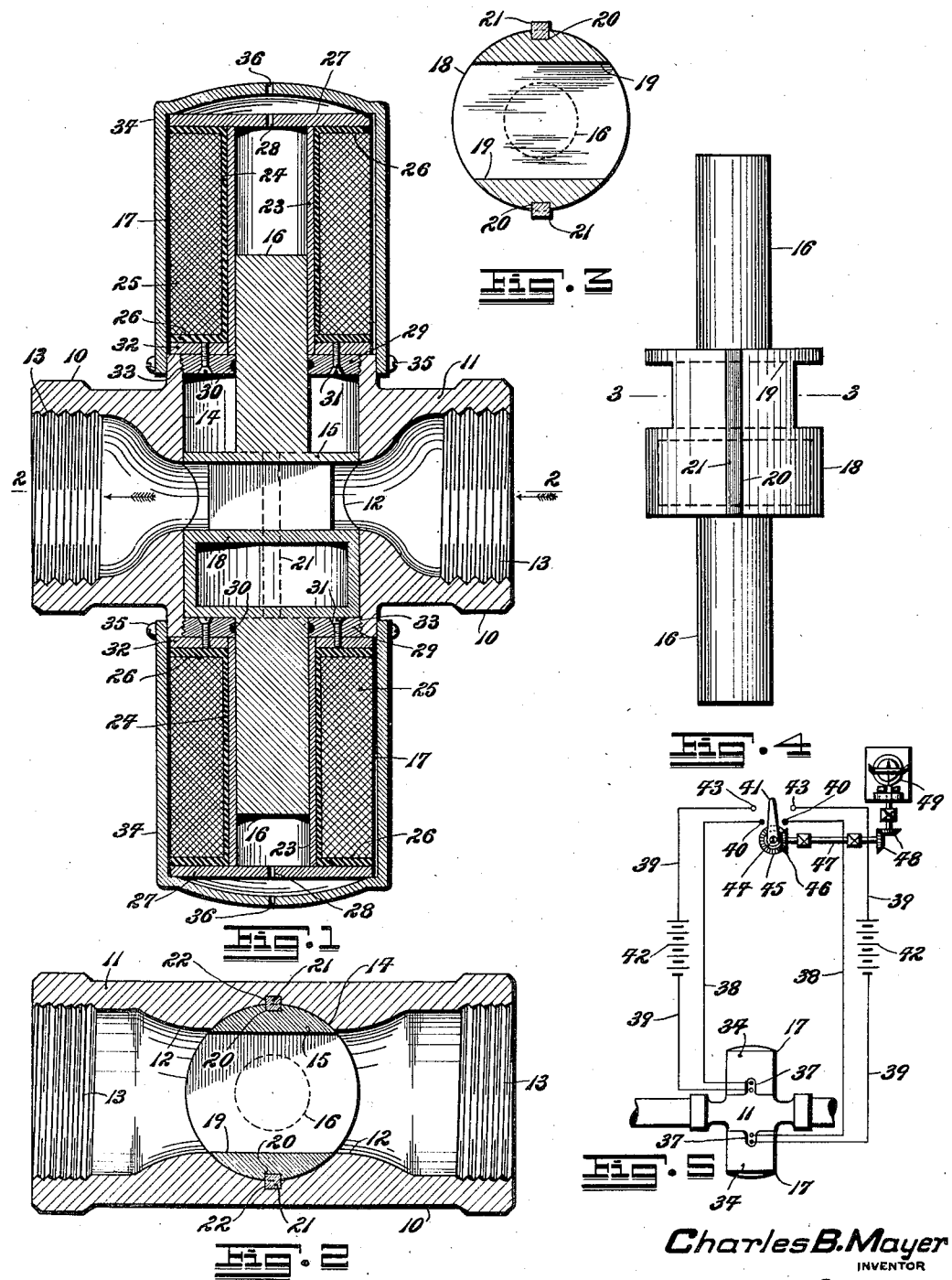
Charles B. Mayer
INVENTOR
Alfred T. Bratton
WITNESS:
BY Victor J. Evans
ATTORNEY.

Patented Nov. 20, 1923.

1,475,129

UNITED STATES PATENT OFFICE.

CHARLES B. MAYER, OF PHILADELPHIA, PENNSYLVANIA.

ELECTRICAL VALVE.

Application filed June 4, 1920. Serial No. 386,634.

*To all whom it may concern:*

Be it known that I, CHARLES B. MAYER, a citizen of the United States, residing at Philadelphia, in the county of Philadelphia and State of Pennsylvania, have invented new and useful Improvements in Electrical Valves, of which the following is a specification.

This invention relates to valves and it has more particular reference to an electrically operated valve that is opened and closed automatically by a thermostat in accordance with surrounding temperature conditions; in other words any deviation or rise or fall in temperature relative to or from a predetermined degree, correspondingly affects the opening and closing of the valve.

The main object of my invention is to provide a thermo-electrically operated valve which is adapted to be used in pipe lines conveying water, gas, air, steam or other fluid, the internal pressure of which at a predetermined degree serves to maintain the valve in an open position whilst any surrounding rise in temperature will automatically lift the valve and partially or entirely cut off the flow of fluid until the temperature has fallen to the normal.

Another object of this invention is to provide an electrically operated valve which will automatically control the supply of heating fluid—for example—to a heater and which is arranged to be operated by a thermostatic switch.

Still further my invention has for an object to provide a light, compact, and simply constructed valve of the type above referred to, which is positive in action, consists of few parts, and can be cheaply installed.

With the foregoing objects in view my improved electrical valve essentially comprises a conduit casing provided with a valve chamber axially at right angles thereto, and a valve located in said chamber having projections serving as plungers which co-operate with opposed electro-magnets whereby the opening and closing of the valve is automatically effected.

In the further disclosure of the invention, reference is to be had to the accompanying sheet of explanatory drawings constituting a part of this specification and in which like characters of reference designate the same or corresponding parts in all the views.

Figure 1—is a central vertical section through a valve embodying my improvements.

Figure 2—is a transverse section taken substantially on the line 2—2 in the preceding figure.

Figure 3—is a section taken substantially on the line 3—3 in Figure 4.

Figure 4—is a detached elevation of the valve member; and

Figure 5—is a diagrammatic plan showing my improved valve in installed relation with a thermostatic actuable switch.

Referring to the drawings and more particularly to Figures 1–4 inclusive, the numeral 10 designates my improved valve in its entirety, said valve comprising a cylindrical body or shell 11, having a reduced longitudinal bore 12 which has both ends screw-threaded as at 13 for its attachment in a pipe line connecting up a radiator—not shown—with a source of heat such as is employed for heating purposes in hot houses, dwellings and the like. At right angles to the aforesaid bore 12, the shell 11, is formed with a valve chamber 14 in which is located the valve 15, that includes opposed stem portions 16 that serve in use as the plungers for electromagnets 17, 17, hereafter more fully described and said valve 15 is provided with a medial portion 18 which is made a working fit in the chamber 14 and a transverse passage-way 19. Longitudinal keyways or grooves 20 are provided in the valve medial portion 18 for the seating of rectangular guide bars 21 which co-operate with grooves 22 in the shell 11, and thereby prevent the valve from rotation but permit of its easy longitudinal movement.

Each electromagnet 17 comprises a tubular core 23 of an internal diameter to be an easy working fit for the aforesaid plungers 16 and said core 23 is surrounded by a thick paper or other suitable insulation sleeve 24 which serves as a support for the field windings or spools 25. Fibre disks 26, 26, are provided at each end of the field windings or spools 25, and at the outer end of each electromagnet is a disk 27 having a vent 28. In order to provide a seating for the valve 15, I preferably thread into each end of the valve chamber 14 a disk 29 which is centrally apertured for the passage of the plungers 16, packing rings 30 of appropriate nature are fitted in the apertured portions to prevent leakage, and on said disks 29 are secured by screws 31, which pass through washers or flanges 32. The disks 29 are threaded at 33 on to the ends of the shell 11 as shown. Covering sleeves or caps 34 are fitted over the spools 25 and held in place on the shell 11 by screws 35, and they are also furnished with vents 36 and slots 37 for the passage of the ends of the wires 38, 39.

Referring now more particularly to Figure 5, it will be readily seen that each wire 38 is conducted to one contact 40 of a switch 41 and similarly that each wire 39 connects through a battery or other source of electric energy 42, to the other contact 43 of said switch 41. Mounted in convenient position and arranged to close a circuit through each battery 42 is the switch 41 appropriately keyed on the end of a shaft 44 having a mitre gear 45 in mesh with a corresponding gear 46 carried by a shaft 47 which is arranged through mitre gears 48 to be rotated in either direction by a thermostat 49, which may be of any desired construction, and as many such thermostatic devices are available for the purpose it is not deemed necessary to illustrate or describe same in detail beyond briefly stating that it is adapted to rotate the shaft 47 to move the switch 41 over either pair of contacts 40, 43, as hereinafter explained.

Now assuming that my improved electric valve 17 has been installed as set forth—in a hot house for example—and that the thermostat 49 has been geared to hold the switch 41 in the position shown in Figure 5, at a predetermined temperature;—that is to say, midway between the contacts 40, 40,—43, 43—it will be readily understood that instantly the temperature rises or falls below the said temperature motion will be imparted through the gears 48, 46, 45, to the shaft 44, carrying the switch 41 and move the latter into engagement with either the right or left hand pair of contacts 40, 43, whereby a circuit will be established through one or other of the batteries 42 to the associated electromagnet 17 which becoming energized will attract its plunger 16 and move the valve 15 from the open to partially open or closed position, and vice versa. It will also be readily understood that by arranging the contacts 40, 40—43, 43, in close juxtaposition that the slightest deflection of the switch 41 in either direction will close a circuit to actuate the valve 15 and thereby automatically restore the normal or predetermined temperature.

From the foregoing description it will be readily seen that by disposing the electromagnets 17 as set forth relative to the valve 10 all danger of the destructive action of the fluid or gas passing therethrough is avoided. Furthermore whilst I have described and illustrated a preferred embodiment of the invention and as best known to me at the present time, I do not desire it to be understood that I am limited strictly to all the details of construction herein set forth, as the same may be varied to accommodate different usages, such changes and other modifications however being limited to the scope and ambit of the appended claim.

Having described my invention what I claim as new and desire to secure by Letters Patent, is:—

A valve of the character described comprising a body portion having a centrally reduced longitudinal bore, a valve chamber arranged at right angles to the reduced portion of the bore and disposed on opposite sides thereof, a valve reduced adjacent one end and having a passage-way formed through the reduced portion, a medial portion at the opposite end of the valve and being adapted to normally close the centrally reduced portion, a centrally apertured disk threadedly secured to the inner side of each end of the valve chamber, a packing ring secured in the inner periphery of each of the apertured disks, caps having an open end secured to the outer side of each end of the valve chamber and each being provided with a centrally disposed vent, a disk engaging the closed end of each cap and being provided with a vent registering with the vent in the cap, a tubular core arranged centrally in each cap and having its ends engaging the vented disk and the apertured disk respectively, oppositely disposed stems formed on the valve and being slidably mounted in the respective cores and means arranged between the cores and the side walls of the cap for energizing the stems as and for the purpose specified.

In testimony whereof I affix my signature.

CHARLES B. MAYER.